Patented Jan. 8, 1952

2,581,930

UNITED STATES PATENT OFFICE 2,581,930

STABILIZATION OF RUBBER WITH A MIXTURE OF A PHENOL SULFIDE AND TRIVALENT ANTIMONY OXIDE

Harry E. Albert, Akron, Ohio, assignor to The Firestone Tire & Rubber Company, Akron, Ohio, a corporation of Ohio No Drawing. Application January 25, 1950, Serial No. 140,555

5 Claims. (Cl. 260—45.75)

This invention relates to the stabilization of rubber with a mixture of a phenol sulfide and trivalent antimony oxide.

This application is a continuation-in-part of my application Serial No. 720,486, filed January 6, 1947 which in turn is a continuation-in-part of my applications Serial Nos. 623,851 and 623,852, filed October 22, 1945. The two latter applications have become abandoned and the first application has matured into U. S. 2,514,193. Those applications relate to the stabilization of rubber with antimony phenol sulfides. The antimony oxide and phenol sulfides used in the mixtures employed in carrying out the present invention do not react at vulcanization temperatures and the stabilizing action of the mixtures is therefore due to the co-action of the two ingredients.

The antimony oxide is trivalent antimony oxide. The phenol sulfides contain two or more aromatic nuclei. These nuclei may include alkyl or halogen substituents. Phenol monosulfides, disulfides, and polysulfides may be used in the mixture but where discoloration is to be prevented the monosulfides will ordinarily be preferred. The phenol sulfides may be represented by the following formula:

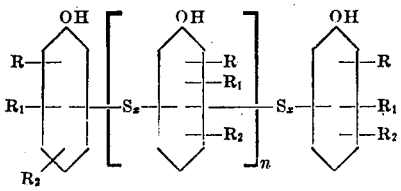

where R, R₁ and R₂ may be hydrogen, halogen, or hydrocarbon substituents which contain up to eight carbon atoms and may be different or the same in each of the aromatic nuclei; $n$ may be an integer from 0 to 3, inclusive, so that there are from 2 to 5, inclusive, aromatic nuclei in the phenol sulfide; and $x$ may be an integer from 1 to 4, inclusive, but preferably is 1. Representative compounds include, for example, diphenol sulfide, diphenol polysulfide, triphenol bi(monosulfide), di(para-tertiary-amylphenol) monosulfide, di(para-tertiary-butylphenol) disulfide, di(ortho-cresol) monosulfide, di(meta-cresol) monosulfide, di(beta-naphthol) monosulfide, di(paraphenylphenol) monosulfide, di(4 - benzylphenol) monosulfide, di(para - chlorphenol) monosulfide, tri(para-tertiary-octylphenol) monosulfide, di(6-tertiary-butyl-m-cresol) monosulfide.

In the mixture of antimony oxide and phenol sulfide equivalent weights of the two components will ordinarily be employed. However, the mixture may contain as little as 10 parts by weight of either component with 90 parts by weight of the other component. The amount of the mixture used will depend upon the use to which the rubber is to be put and any small amount from one-tenth of a per cent up to about 10 per cent, for example, may be used.

The mixture of antimony oxide and phenol sulfide stabilizes natural rubber and the synthetic rubbers. It is particularly valuable in the stabilization of the copolymer of butadiene and styrene, known as GR–S. More generally it may be used for the stabilization of the copolymer of (1) any hydrocarbon conjugated-diene monomer, including butadiene, isoprene, cyclopentadiene, piperylene, dimethyl butadiene, 2-methyl-1,3-pentadiene, etc., and (2) a vinyl aromatic monomer, including, for example, styrene, alpha-methyl styrene, nuclear-substituted styrenes, monochloro styrene, dichloro styrene, vinyl naphthylene, vinyl biphenyl, vinyl carbazole, 2-vinyl-5-ethylpyridene, 2-ethyl-5-vinylpyridine, etc. The mixture may likewise be used but probably with less satisfactory results for the stabilization of any copolymer of any of the foregoing hydrocarbon conjugated-diene monomers and a monomer having the formula

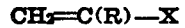

when R is hydrogen, methyl, ethyl, propyl or chlorine, and X is —CN, —COR', —COOR' or —CONH₂ and R' is an alkyl group containing about 1 to 5 carbon atoms. The copolymers of butadiene and acrylonitrile are the best known rubbers of this latter group.

The invention will be illustrated by reference to the stabilization of GR–S by a mixture containing equivalent amounts by weight of diphenol sulfide and trivalent antimony oxide. Two per cent of the mixture was added to a latex of GR–S before coagulation, so that on coagulation the components of the mixture were thoroughly dispersed throughout the copolymer. GR–S copolymer was similarly prepared by coagulation of GR–S latices containing two per cent of phenyl-beta-naphthylamine and a widely used commercial stabilizer which is identified herein as stabilizer No. 1. The three samples of copolymer thus prepared were dried for 20 hours at 75° C. The dried samples were compared to note any discoloration which had taken place and for evidence of deterioration. The samples were then heat-aged at 110° C. and comparative tests were made after one day, two days and four days to note any discoloration and evidences of deterioration. The results are recorded in the following table:

TABLE I
Copolymer aging test

| | Equivalent amounts of diphenol sulfide and antimony oxide | Stabilizer No. 1 | Phenyl-beta-naphthylamine |
|---|---|---|---|
| After drying 20 hours at 75° C.: | | | |
| Color | Light gray-brown. | Bluish gray | Red-brown. |
| Hand Test | No deterioration. | No deterioration. | No deterioration. |
| Heat-aging at 110° C.: | | | |
| One day: | | | |
| Color | Light brown | Brown | Brown. |
| Hand Test | No change | Very slightly set up. | No change. |
| Two Days: | | | |
| Color | Light brown | Dark brown | Dark brown. |
| Hand Test | No change | Somewhat set up. | Very slightly set up. |
| Four Days: | | | |
| Color | Light brown | Dark brown | Dark brown. |
| Hand Test | Slightly set up. | Set up | Somewhat set up. |

The sample containing the mixture of antimony oxide and phenol sulfide discolored less than the commercial stabilizers and deteriorated less quickly. In fact, after four days' aging the sample containing the mixture still showed little evidence of deterioration.

Portions of the unaged copolymer containing the mixture of antimony oxide and phenol sulfied, and that containing stabilizer No. 1, were then compounded according to the following formula:

| | Parts by weight |
|---|---|
| Copolymer containing 2% stabilizer | 100.00 |
| Coumarone resin | 10.00 |
| Accelerator | 1.10 |
| Wax | 2.00 |
| Magnesium oxide | 8.00 |
| Zinc oxide | 100.00 |
| Ultramarine blue | 0.10 |
| Titanium dioxide | 30.00 |
| Insoluble sulfur | 4.00 |

The different samples were each cured at 300° F. for 30, 50 and 70 minutes respectively. The values obtained for the physical properties of the various stocks were averaged and are recorded in the following table. The values recorded for the aged stock were obtained on the samples after aging four days in a forced circulation oven at 212° F.

TABLE II

| | Mixture of Equivalent Amounts of Antimony Oxide and Diphenol Sulfide | Stabilizer No. 1 |
|---|---|---|
| 200% Modulus: | | |
| Unaged | 300 | 370 |
| Aged | 740 | 860 |
| Per Cent Increase | 246 | 233 |
| Tensile: | | |
| Unaged | 1540 | 1300 |
| Aged | 1450 | 1400 |
| Per Cent of Unaged | 94.5 | 107.5 |
| Elongation: | | |
| Unaged | 620 | 490 |
| Aged | 430 | 370 |
| Per Cent of Unaged | 69.5 | 75.5 |

In a further test the unaged white vulcanizates prepared as described were subjected to accelerated aging in artificial light and also to aging by exposure to the sun. The results are recorded in the following table:

TABLE III

Artificial exposure tests

| Antioxidant | Fadeometer at 125° F. | | G. E. Sunlamp at 7 inches | |
|---|---|---|---|---|
| | 5 Hours | 10 Hours | 8 Hours | 16 Hours |
| Mixture of equivalent amounts of antimony oxide and diphenol sulfide | White | White | White | Tan |
| Stabilizer No. 1 | Tan | Light brown | Tan | Light brown |

Natural exposure

| Antioxidant | 2 months in Florida (February-April) | 2 Months in Florida+2 Months in Akron (May-July) |
|---|---|---|
| Mixture of equivalent amounts of antimony oxide and diphenol sulfide | White | Very slightly discolored |
| Stabilizer No. 1 | Light cream | Tan |

The above tests are illustrative.

What I claim is:

1. Rubber-like copolymer of a hydrocarbon conjugated-diene monomer and vinyl aromatic monomer stabilized with a relatively small amount of a mixture of trivalent antimony oxide and a phenol sulfide of 2 to 5 aromatic nuclei of the class in which the nuclei are unsubstituted, those which are halogen substituted, and those which are substituted with hydrocarbon groups of 1 to 10 carbon atoms, which mixture contains at least 10 parts by weight of the one component and up to 90 parts by weight of the other component.

2. Cured rubber-like copolymer of butadiene and styrene stabilized with a relatively small amount of a mixture of trivalent antimony oxide and a phenol sulfide having 2 to 5 aromatic nuclei of the class consisting of those which are unsubstituted, those which are halogen substituted and those which are substituted with hydrocarbon substituents of 1 to 10 carbon atoms, the mixture containing at least 10 parts by weight of one component and up to 90 parts by weight of the other component.

3. The process of curing rubber-like copolymer of butadiene and styrene which comprises curing the same with sulfur in the presence of a relatively small amount of a mixture of trivalent antimony oxide and a phenol sulfide having 2 to 5 aromatic nuclei of the class consisting of those which are unsubstituted, those which are halogen substituted and those which are substituted with hydrocarbon substituents of 1 to 10 carbon atoms, the mixture containing at least 10 parts by weight of one component and up to 90 parts by weight of the other component.

4. Rubber-like copolymer of butadiene and styrene stabilized with a relatively small amount of a mixture composed of equivalent amounts by weight of trivalent antimony oxide and diphenol sulfide.

5. The process of curing rubber-like copolymer of butadiene and styrene which comprises heating the same with sulfur and a relatively small amount of a mixture of equivalent amounts by weight of trivalent antimony oxide and diphenol sulfide.

HARRY E. ALBERT.

REFERENCES CITED

The following references are of record in the file of this patent:

UNITED STATES PATENTS

| Number | Name | Date |
| --- | --- | --- |
| 2,175,082 | Hagen et al. | Oct. 3, 1939 |
| 2,244,021 | Rosen et al. | June 3, 1941 |
| 2,364,338 | Beaver | Dec. 5, 1944 |

OTHER REFERENCES

Werner: Esch. Farben-Chem., 10 pp., 129–130, 1939; C. A. 34, 3133 (1940).